United States Patent
Zhang et al.

(10) Patent No.: US 9,407,586 B2
(45) Date of Patent: Aug. 2, 2016

(54) METHOD AND SYSTEM FOR CROSS DEVICE NOTIFICATION

(71) Applicant: Yahoo! Inc., Sunnyvale, CA (US)

(72) Inventors: Gaonan Zhang, Beijing (CN); Li Rong, Beijing (CN)

(73) Assignee: YAHOO! INC., Sunnyvale, CA (US)

( * ) Notice: Subject to any disclaimer, the term of this patent is extended or adjusted under 35 U.S.C. 154(b) by 325 days.

(21) Appl. No.: 14/344,120

(22) PCT Filed: Mar. 15, 2013

(86) PCT No.: PCT/CN2013/000299
§ 371 (c)(1),
(2) Date: Mar. 11, 2014

(87) PCT Pub. No.: WO2014/139054
PCT Pub. Date: Sep. 18, 2014

(65) Prior Publication Data
US 2016/0057086 A1    Feb. 25, 2016

(51) Int. Cl.
*G06F 15/16* (2006.01)
*H04L 12/58* (2006.01)
*H04L 12/28* (2006.01)
*H04L 29/08* (2006.01)

(52) U.S. Cl.
CPC ......... *H04L 51/066* (2013.01); *H04L 12/2825* (2013.01); *H04L 51/24* (2013.01); *H04L 51/36* (2013.01); *H04L 67/12* (2013.01)

(58) Field of Classification Search
CPC ..... H04L 12/2825; H04L 51/24; H04L 51/36; H04L 67/12
USPC .......................................................... 709/206
See application file for complete search history.

(56) References Cited

U.S. PATENT DOCUMENTS

| | | | |
|---|---|---|---|
| 2014/0173026 A1* | 6/2014 | Buck | H04L 51/24 709/217 |
| 2015/0373089 A1* | 12/2015 | Koss | H04L 67/10 709/205 |
| 2016/0057086 A1* | 2/2016 | Zhang | H04L 12/2825 709/206 |

* cited by examiner

*Primary Examiner* — Jerry Dennison
(74) *Attorney, Agent, or Firm* — Pillsbury Winthrop Shaw Pittman LLP

(57) ABSTRACT

Method and system for cross device notification (CDN) are provided. An incoming event is received at a first device associated with a user. The first device detects one or more active devices associated with the user other than the first device. Whether the user reacts to the incoming event is detected on the first device. Whether a CDN is needed is determined based on whether the one or more active devices are detected and/or whether the user reacts to the event within a predetermined time period. If a CDN is needed, the CDN is generated and transmitted to the one or more active devices.

22 Claims, 10 Drawing Sheets

METHOD AND SYSTEM FOR CROSS DEVICE NOTIFICATION

BACKGROUND

1. Technical Field

The present teaching relates generally to communication. Specifically, the present teaching relates to method and system for device notification.

2. Discussion of Technical Background

The advancement in the Internet has made it possible to connect multiple devices associated with one user through the Internet. With more or more devices a user can have and such devices may be at different locations, it is difficult, if not impossible, for the user to monitor different devices associated with the user.

Effort has been made to enable one device of a user to send a message to another device of the same user. However, conventional approaches cannot inform the user on a device as to what is happening on another device when there is an event happening on the device, especially when the device is located elsewhere. Therefore, there is a need to develop a solution for cross device notification while an event is happening.

SUMMARY

The present teaching describes methods, apparatus, systems, and programming for cross device notification.

In one exemplary embodiment, a method, implemented on at least one machine having at least one processor, storage, and a communication platform connected to a network for cross device notification (CDN), is provided. An incoming event is received at a first device associated with a user. The first device detects one or more active devices associated with the user other than the first device. Whether the user reacts to the incoming event is detected on the first device. Whether a CDN is needed is determined based on whether the one or more active devices are detected and/or whether the user reacts to the event within a predetermined time period. If a CDN is needed, the CDN is generated and transmitted to the one or more active devices.

In another exemplary embodiment, a method, implemented on at least one machine having at least one processor, storage, and a communication platform connected to a network for responding to a CDN, is provided. A CDN is received, at a first device associated with a user, from a second device associated with the user. The first device detects one or more active devices associated with the user other than the first device. Whether the user reacts to the CDN is detected. If the user reacts to the CDN within a predetermined time period, a react notification with respect to the CDN is sent to the second device. If the user reacts to the CDN within a predetermined time period and if the one or more active devices are detected, the react notification is sent to the one or more active devices.

In still another exemplary embodiment, an apparatus including at least one processor, storage, and a communication platform connected to a network for CDN, is provided. The apparatus comprises an event detector, a user reaction detector, a CDN controller, and a CDN generator. The event detector is configured for receiving an incoming event. The user reaction detector is configured for detecting whether the user reacts to the incoming event. The CDN controller is configured for detecting one or more active devices. The apparatus and the one or more active devices are associated with a user. The CDN controller is further configured for determining whether a CDN is needed based on whether the one or more active devices are detected and/or whether the user reacts to the event within a predetermined time period. The CDN generator is configured for generating and transmitting the CDN to the one or more active devices, if a CDN is needed.

In yet another exemplary embodiment, an apparatus including at least one processor, storage, and a communication platform connected to a network for responding to a CDN, is provided. The apparatus comprises a CDN receiver, a CDN controller, and a user reaction detector. The CDN receiver is configured for receiving a CDN from a device. The apparatus and the device are associated with a user. The CDN controller is configured for detecting one or more active devices associated with the user. The user reaction detector is configured for detecting whether the user reacts to the CDN. The user reaction detector is further configured for sending a react notification with respect to the CDN to the device if the user reacts to the CDN within a predetermined time period. The user reaction detector is further configured for sending the react notification to the one or more active devices, if the user reacts to the CDN within a predetermined time period and if the one or more active devices are detected.

In a different exemplary embodiment, a system including at least one machine having at least one processor, storage, and a communication platform connected to a network for CDN, is provided. The system comprises a first device associated with a user, at least one second device associated with the user, and a CDN mechanism residing in each of the devices associated with the user. The mechanism enables the first device to detect one or more active second devices, detect whether the user reacts to an incoming event, and determine whether a CDN is needed based on whether the one or more active second devices are detected and/or whether the user reacts to the incoming event within a first predetermined time period. The mechanism further enables the first device to generate and transmit the CDN to the one or more active second devices if a CDN is needed. The mechanism further enables each of the one or more active second devices to receive a CDN from the first device, detect each remaining active second device, and detect whether the user reacts to the CDN on the active second device. The mechanism further enables each of the one or more active second devices to send a react notification with respect to the CDN to the first device if the user reacts to the CDN within a second predetermined time period, and send the react notification to each remaining active second device, if the user reacts to the CDN within a second predetermined time period and if the remaining active second device is detected.

Other concepts relate to software for cross device notification. A software product, in accord with this concept, includes at least one machine-readable non-transitory medium and information carried by the medium.

In one exemplary embodiment, a machine-readable tangible and non-transitory medium having information for CDN, wherein the information, when read by the machine, causes the machine to receive, at a first device associated with a user, an incoming event, wherein the first device detects one or more active devices associated with the user other than the first device, detect whether the user reacts to the incoming event on the first device, determine whether a CDN is needed based on whether the one or more active devices are detected and/or whether the user reacts to the event within a predetermined time period, and generate and transmit the CDN to the one or more active devices if a CDN is needed.

In a different exemplary embodiment, a machine-readable tangible and non-transitory medium having information for responding to a CDN, wherein the information, when read by the machine, causes the machine to receive, at a first device associated with a user, a CDN from a second device associated with the user, wherein the first device detects one or more active devices associated with the user other than the first device, detect whether the user reacts to the CDN, send a react notification with respect to the CDN to the second device if the user reacts to the CDN within a predetermined time period, and send the react notification to the one or more active devices, if the user reacts to the CDN within a predetermined time period and if the one or more active devices are detected.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to the embodiments of the present teaching, examples of which are illustrated in the accompanying drawings. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

Various embodiments in accordance with the present teaching provide method and system related to CDN, i.e., a notification sent from one device to another device while an event is happening at one of the devices. More specifically, the method and system in various embodiments of the present teaching relate to CDN among different synchronized devices of the same user in real time while some event is happening on one of the devices of the same user.

There may be a plurality of devices associated with one user. Such multiple devices or active devices of such multiple devices may be synchronized via a network so that each active device can be made aware of what is happening on other active devices. The active devices may refer to devices that are powered on or being actively used by the user at that moment. Based on an incoming event at one device, CDN may be generated to be sent to the other synchronized active devices associated with the same user, in real time via the network.

Additional features will be set forth in part in the description which follows, and in part will become apparent to those skilled in the art upon examination of the following and the accompanying drawings or may be learned by production or operation of the examples.

Figure 1:
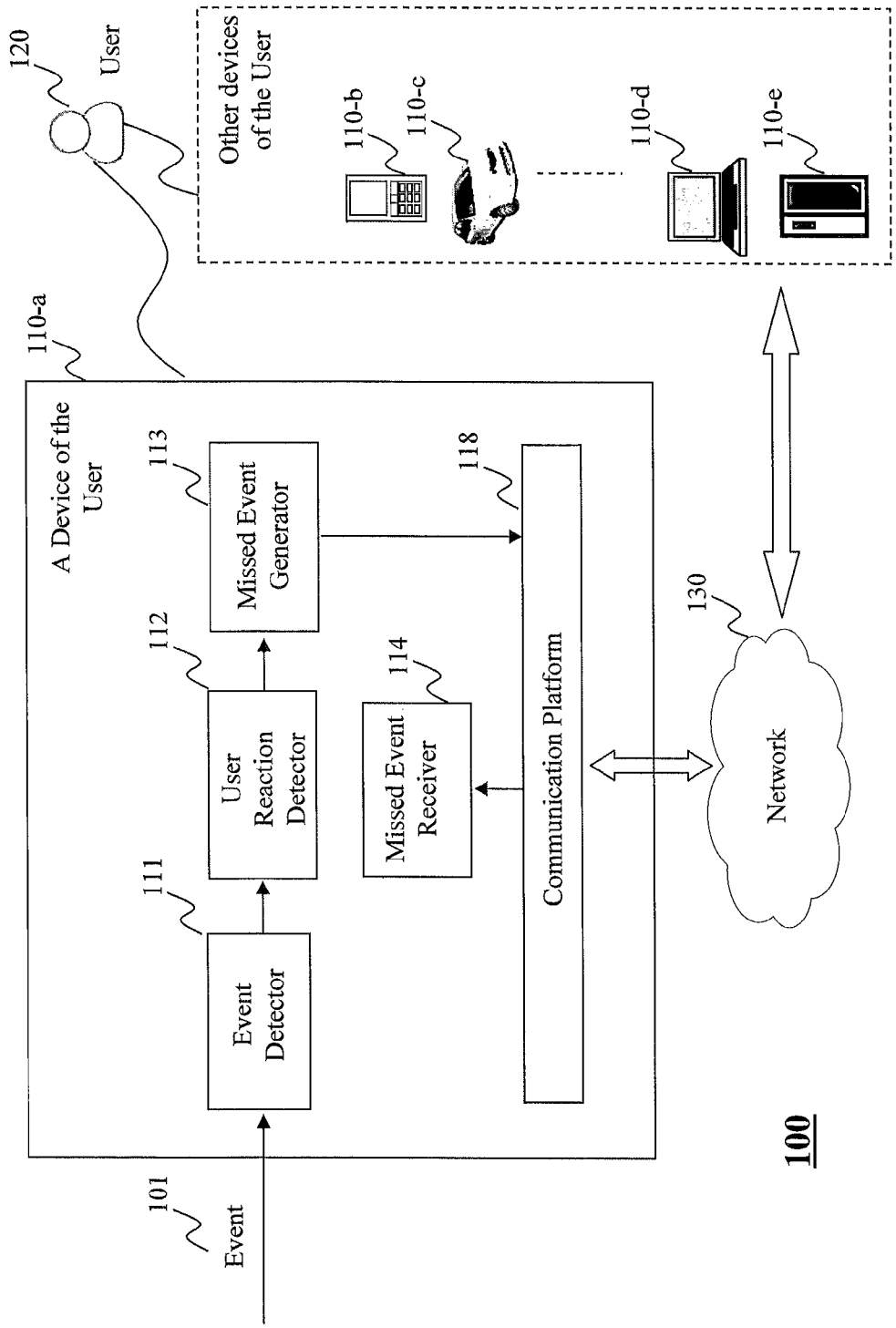
FIG. 1 (PRIOR ART) illustrates an exemplary system configuration that sends a notification on an event that is not responded.

FIG. 1 (PRIOR ART) illustrates an exemplary system configuration that sends notification for event that is not responded. The system 100 includes a user 120, a network 130, and a plurality of devices 110-a, 110-b, 110-c, 110-d, and 110-e.

The plurality of devices 110-a, 110-b, 110-c, 110-d, and 110-e, may be associated with the user 120. The device 110-a may include an event detector 111, a user reaction detector 112, a missed event generator 113, a missed event receiver 114, and a communication platform 118 connected to the network 130. When an incoming event 101 is received at the event detector 111 of the device 110-a, the user reaction detector 112 may detect whether the user 120 reacts to the incoming event 101 or not. In this system 100, only after the event 101 is missed, the missed event generator 113 may generate a missed event message and transmit the missed event message to the other devices 110-b, 110-c, 110-d, and 110-e of the user 120, via the communication platform 118. The event 101 can be missed either due to no reaction from the user 120 or due to a reaction to dismiss the event 101 from the user 120.

In the system 100, when the device 110-a is still waiting for a reaction from the user 120, no message can be sent to the other devices 110-b, 110-c, 110-d, and 110-e. In addition, the device 110-a has no information about which of the other devices is currently being used by the user 120. For example, the device 110-d may be powered off and not being used by the user 120 at the moment when the device 110-a is trying to send the missed event message, yet the device 110-a sends out the message to the device 110-d anyway. The missed event receiver 114 is configured for receiving a missed event message from other devices 110-b, 110-c, 110-d, and 110-e of the user 120.

Figure 2:
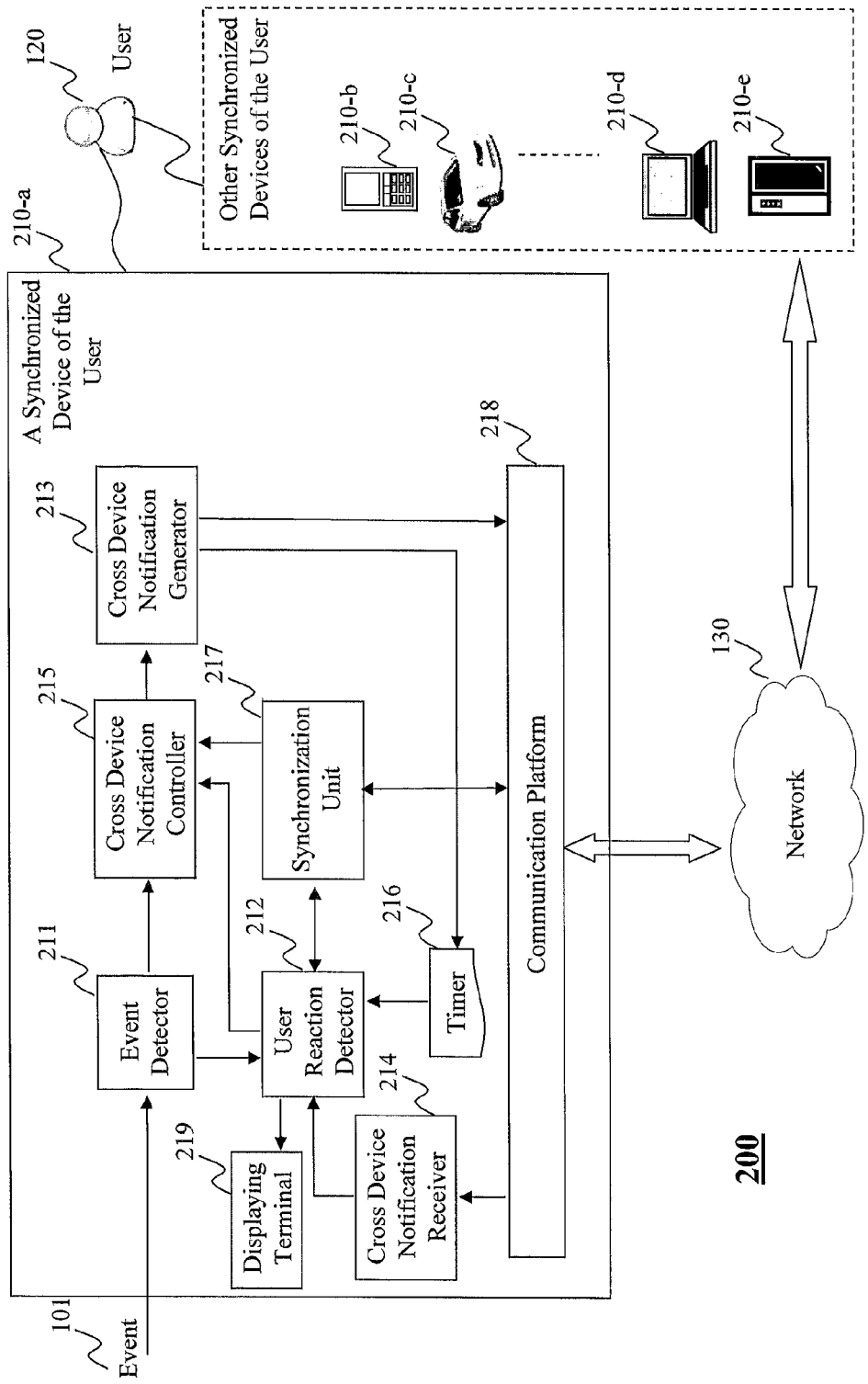
FIG. 2 illustrates an exemplary system diagram for cross device notification (CDN), in accordance with one embodiment of the present teaching.

FIG. 2 illustrates an exemplary system 200 for CDN, in accordance with one embodiment of the present teaching. The exemplary system 200 includes the user 120, the network 130, and a plurality of devices 210 (including 210-a, 210-b, 210-c, 210-d, and 210-e). The plurality of devices 210 may be associated with the user 120. For example, the plurality of devices 210 may all belong to the user 120, or may all run an application with a same user identification (ID) that is associated with the user 120. In some embodiments, there may be only two devices associated with the user 120.

In the system 200, the plurality of devices 210 can be synchronized to each other via the network 130, so that one or more active devices can be determined among the plurality of devices 210. For example, sync signals or messages may be exchanged continuously among the plurality of devices 210 for synchronization, via the network 130. The sync signals or messages may be exchanged among the devices 210 directly, via the network 130, when the network 130 is a LAN. The sync signals or messages may be exchanged among the devices 210 through a server or proxy connected to the network 130, when the network 130 is a WAN. The server or proxy can receive and forward the sync signals or messages to any of the devices 210.

The sync signals or messages may carry sync information for indicating one or more active devices among the plurality of devices 210. In some embodiments, the active devices may include devices that are being used by the user 120 at the time when the sync information is exchanged. In one example, if the user 120 just clicked a mouse connected to his computer, then sync information can be exchanged to the other devices of the user 120 for indicating that the computer is now an active device. If multiple actions of the user 120 are detected on multiple devices within a latest time period, all of the multiple devices may be indicated as active devices at that time period. In addition, if multiple actions of the user 120 are detected on multiple devices within a latest time period, each of the multiple devices may be indicated as an active device with a score. The score may be determined based on the time of a last action detected on each active device. For example, an active device having a last action detected later than the other active devices may have the highest score. Thus the multiple active devices can be ranked according to their scores. In another example, the user 120 may explicitly identify the one or more active devices, e.g., by a means of input at one of the devices associated with the user 120 and exchanging sync information among the plurality of device 210. In other embodiments, the active devices may include devices that are powered on at the time when the sync information are exchanged or all synchronized devices that are associated with the user 120.

Figure 8:
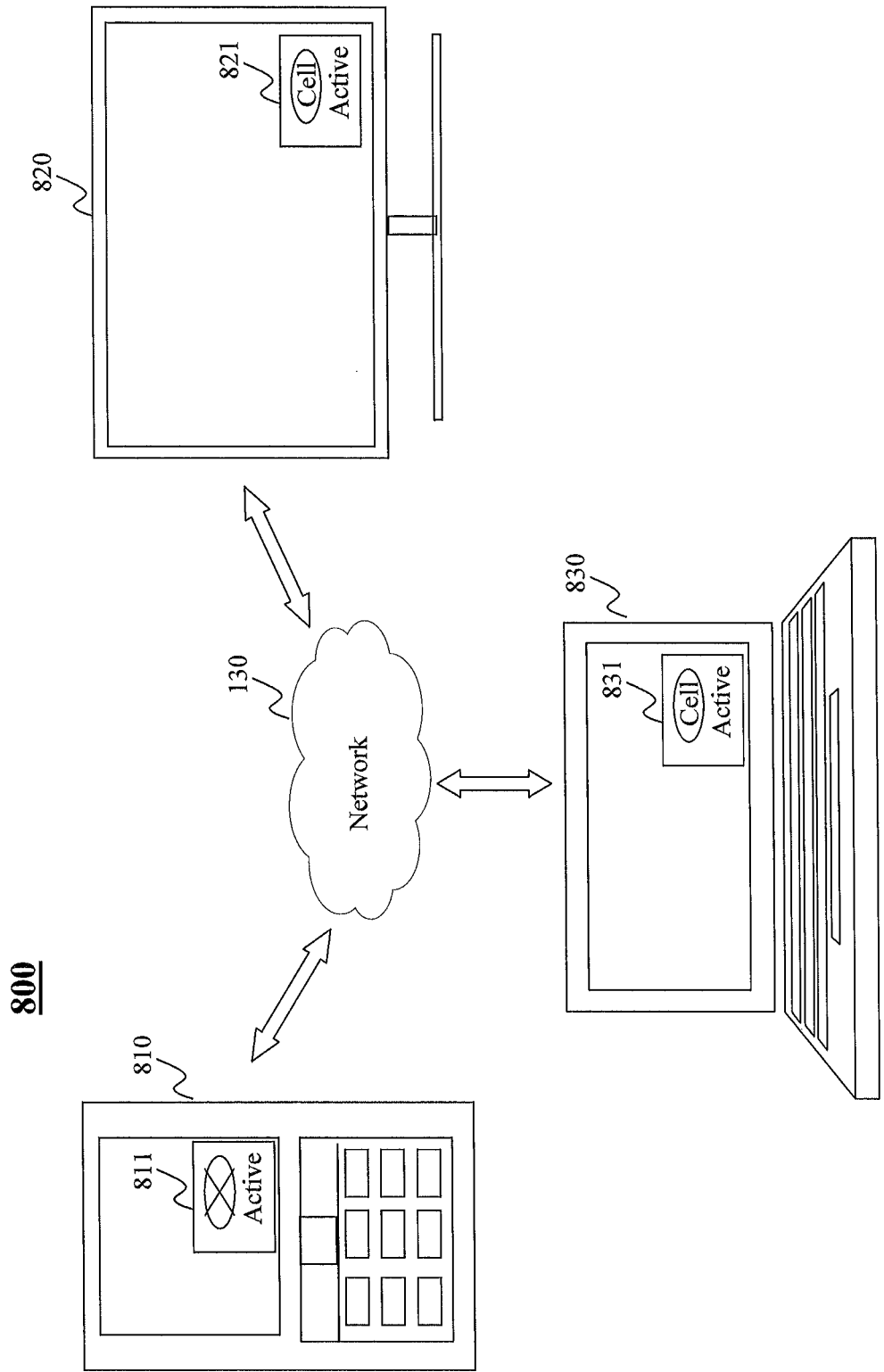
FIG. 8 illustrates multiple devices within an exemplary system configuration for CDN, in accordance with one embodiment of the present teaching.

One example of exchanging sync information for indicating an active device among multiple synchronized devices may be illustrated in FIG. 8. FIG. 8 illustrates multiple devices 810, 820, 830 within an exemplary system 800 for CDN, in accordance with one embodiment of the present teaching. The devices 810, 820, 830 in the system 800 may be associated with one user. The system 800 in this embodiment may include a network 850, via which the devices 810, 820, 830 are synchronized. Each of the devices 810, 820, 830 may have an active device indication area on the screen to show which device is an active device at that moment.

For example, the device 810 may be a cell phone with an active device indication area 811; the device 820 may be a television with an active device indication area 821; the device 830 may be a computer with an active device indication area 831. At the moment shown in FIG. 8, for example, only the cell phone 810 of the devices 810, 820, 830 is an active device. Thus, the active device indication area 811 may be marked for indicating that a local device, cell phone 810 is an active device at that moment. Based on sync information exchanged among the devices 810, 820, 830, the other two devices may also be acknowledged that the cell phone 810 is an active device at that moment. The active device indication area 821 and the active device indication area 831 may both indicate the acknowledgement about active device by showing a term "cell" to represent the active device cell phone 810 at that moment.

In addition, the sync signals or messages may carry sync information for indicating whether a user reaction has been detected at one of the synchronized devices 210. The user reaction may be with respect to an incoming event or a CDN from another synchronized device.

The network 130 in the system 200 can be a single network or a combination of different networks. For example, a network can be a local area network (LAN), a wide area network (WAN), a public network, a private network, a proprietary network, a Public Telephone Switched Network (PSTN), 2G/3G/4G mobile network, the Internet, a wireless network, a virtual network, or any combination thereof.

A block diagram illustrating an exemplary embodiment of the synchronized device 210-*a* is shown in the exemplary system 200 for an explanation of CDN. Any of the other synchronized devices 210-*b*, 210-*c*, 210-*d*, and 210-*e* may comprise a similar structure as shown in the block diagram.

The device 210-*a*, in this exemplary embodiment, may comprise an event detector 211, a user reaction detector 212, a CDN generator 213, a CDN receiver 214, a CDN controller 215, a timer 216, a synchronization unit 217, a displaying terminal 219, and a communication platform 118 connected to the network 130. The synchronization unit 217 may transmit or receive a sync signal or message, via the communication platform 218, for exchanging information with any of the other synchronized devices 210-*b*, 210-*c*, 210-*d*, and 210-*e*. The exchanged information may indicate one or more active devices among the synchronized devices 210 at that moment or whether a user reaction has been detected at one of the synchronized devices 210. The sync information may be received continuously at the synchronization unit 217. The CDN controller 215 may collect the sync information continuously from the synchronization unit 217, for detecting one or more active devices among the other synchronized devices 210-*b*, 210-*c*, 210-*d*, and 210-*e*.

The event detector 211 may receive an incoming event 101 at the device 210-*a*. The event 101 may come through the network 130 or some other networks. Once the event 101 is received, the user reaction detector 212 may detect whether the user 120 reacts to the incoming event 101 or not. The detection at the user reaction detector 212 may last for a first predetermined time period controlled by the timer 216. For example, once the event 101 is received, the user reaction detector 212 may trigger the timer 216 to count down for a first predetermined time period. The first predetermined time period can be determined based on configuration information at the device 210-*a*.

If the user 120 does not react to the incoming event 101 within the first predetermined time period, the displaying terminal 219 may display a first non-react message at the device 210-*a*. As will be explained later, the first non-react message may not necessarily mean that the event 101 is missed, due to a CDN mechanism in this exemplary embodiment. If the user 120 reacts to the incoming event 101 within the first predetermined time period, the user reaction detector 212 may send a react notification to the CDN controller 215; the displaying terminal 219 may display a first react message at the device 210-*a*; and the device 210-*a* may process based on the reaction of the user 120. For example, if the event 101 is an incoming call at a cell phone of the user 120 and the user 120 answers the call, a react notification may be sent to the CDN controller 215; a message may be displayed to indicate the call is answered; and the cell phone may process the call accordingly.

In some embodiments, the user reaction detector 212 may collect the sync information continuously from the synchronization unit 217, for detecting one or more active devices among the other synchronized devices 210-b, 210-c, 210-d, and 210-e. In that case, if the user 120 reacts to the incoming event 101 within the first predetermined time period, the user reaction detector 212 may further send a react notification to the one or more active devices of the user 120.

The CDN controller 215, on the other hand, may start a CDN determination process once the event 101 is received, without waiting for a react notification from the user reaction detector 212. Once the event 101 is received, the CDN controller may obtain some event related information associated with the event 101 from the event detector 211. For example, if the event 101 is an incoming call from a user A at a cell phone of the user 120, the event related information associated with the event 101 may include a user ID representing user A or a phone number of user A.

Then the CDN controller 215 may immediately determine whether a CDN is needed based on: the obtain event related information, the sync information collected from the synchronization unit 217, and whether a react notification has been received by that moment from the user reaction detection 212. In one embodiment, the CDN may be determined to be needed, if one or more active devices have been detected among the other synchronized devices 210-b, 210-c, 210-d, 210-e by the moment of determination, and a react notification has not been received from the user reaction detection 212 by the moment of determination. In another embodiment, the CDN may be determined not to be needed, if a react notification has been received from the user reaction detection 212 by the moment of determination.

If no CDN is needed, the CDN controller 215 may stop further processing and wait for another incoming event at the device 210-a. If a CDN is needed, the CDN controller 215 may control the CDN generator 213 to generate and send the CDN, by determining some features associated with the CDN. For example, the features of the CDN may indicate what information may be included in the generated CDN and where to send the generated CDN. The information included in the generated CDN may depend on the event related information and a device type of the device 210-a. In one example, if the device 210-a is a cell phone and the event 101 is an incoming call, the generated CDN can include all information related to the incoming call, like caller's ID, caller's phone number, calling time, etc. In another example, if the device 210-a is a television and the event 101 is a program shown on the television, the generated CDN can include a name of the program and the time period that the program has been shown. It is understood that in some embodiments, the CDN may include a device ID of the device 210-a.

In one embodiment, the generated CDN may be transmitted, by the CDN generator 213, to all active devices detected by the CDN controller 215, via the communication platform 218. In another embodiment, the generated CDN may be transmitted, by the CDN generator 213, to the most active devices detected by the CDN controller 215. The most active devices may be, for example, the active devices each having a score higher than a predetermined threshold. The score may be determined based on the time of a last action detected on each active device, wherein the later the time is, the higher the score is.

Once the destination devices in accordance with a CDN have been determined, there may be multiple situations for transmitting the CDN. In one situation, the CDN may be transmitted to all of the determined destination devices at the same time. In another situation, the CDN may be transmitted to the determined destination devices one by one, in order of the scores they have based on the time of a last action detected on them. Different scenarios of the destination devices and different situations for transmitting the CDN may all be included in the features determined at the CDN controller 215.

After the CDN is sent, the user reaction detector 212 may detect a user reaction to the CDN based on sync information collected from the synchronization unit 217. The detection for a user reaction to the CDN may last for a second predetermined time period controlled by the timer 216. For example, once the CDN is sent, the CDN generator 213 may trigger the timer 216 to count down for a second predetermined time period. The second predetermined time period can be determined based on configuration information at the device 210-a.

If a user reaction to CDN is detected within the second predetermined time period, the displaying terminal 219 may display a second react message. If no user reaction to CDN is detected within the second predetermined time period, the displaying terminal 219 may display a second non-react message. In accordance with this embodiment, the event 101 can be determined to be missed at the device 210-a, only if both the first and second non-react messages have been displayed. In that case, the user 120 reacts to neither the incoming event 101 at the device 210-a nor the CDN sent by the device 210-a, within predetermined time periods.

It can be understood that in some embodiments, the user 120 can authorize other users, e.g., family members, to obtain the same notifications as described above on one or more devices associated with the authorized users. For example, the user 120 may authorize other people to check an incoming email, messages, etc. This may happen in temporary for emergent issues, e.g., when a mobile device of the user 120 is running out of power. The authorization may only allow new events during a certain time period, which does not require a sharing of username and password of the user 120.

Figure 3:
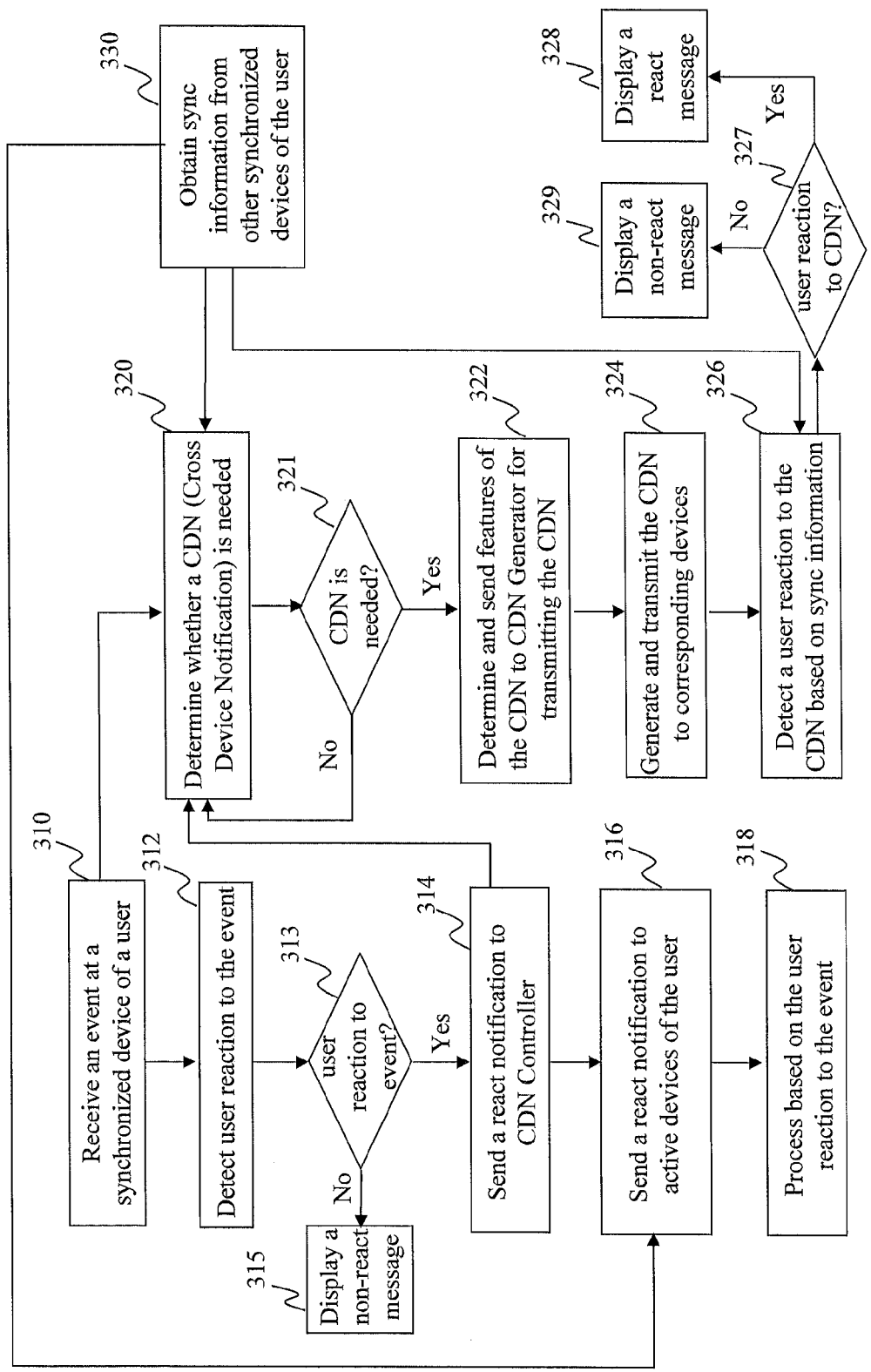
FIG. 3 is a flow chart of an exemplary process for CDN, in accordance with one embodiment of the present teaching.

FIG. 3 is a flow chart illustrating an exemplary process for CDN, in accordance with one embodiment of the present teaching. At 330, sync information may be obtained at the device 210-a associated with a user, from other synchronized devices 210-b, 210-c, 210-d, and 210-e associated with the user 120. In some embodiments, at 330, the sync information may be collected continuously at the device 210-a. The sync information may indicate one or more active devices among the other synchronized devices 210-b, 210-c, 210-d, and 210-e.

At 310, an coming event 101 may be received at the device 210-a. After 310, the process in FIG. 3 may proceed to 312 and 320 in parallel. At 312, a user reaction from the user 120 to the event 101 may be detected for a first predetermined time period. At 313, it can be determined that whether the user 120 reacts to the event 101 within the first predetermined time period. If the user 120 does not react, a first non-react message may be displayed at 315. If the user 120 reacts, a react notification may be sent to the CDN controller at 314. If the user 120 reacts, a react notification may also be sent to the one or more active devices associated with the user 120 at 316. If the user 120 reacts, the device 210-a may continue a process based on the user reaction to the event 101, at 318. For example, a first react message may be displayed at 318. The operations at 314, 316, and 318 may be performed in serial as shown in FIG. 3, or performed in parallel.

At 320, whether a CDN is needed can be determined based on the event received at 310, the sync information obtained at 330, and whether a react notification has been received by the moment of determination at the CDN controller. At 321, if no CDN is determined to be needed, then the process may move back to 320 and wait for another event to proceed. At 321, if a CDN is determined to be needed, the process may move to 322 to determine and send features of the CDN to the CDN generator 213 for transmitting the CDN. For example, the features of the CDN may include content in the CDN and destinations of the CDN. At 324, the CDN may be generated accordingly and transmitted to the corresponding devices in accordance with the determined features at 322.

After the CDN is transmitted, a user reaction to the CDN may be detected based on sync information, at 326, for a second predetermined time period. At 327, it can be determined that whether the user 120 reacts to the CDN within the second predetermined time period. If the user 120 does not react, a second non-react message may be displayed at 329. If the user 120 reacts, a second react message may be displayed at 328.

In some embodiments, the features of the CDN have been determined so that the CDN may be sent to multiple destination devices one by one, instead of at the same time. In that scenario, the operations at 324 and 326 may be performed iteratively. For example, each time the CDN is transmitted to a destination device at 324, a user reaction to the CDN may be detected at 326 for a predetermined time period. If the user 120 does not react within the predetermined time period, the process moves back to 324 for transmitting the CDN to the next destination device. The iterative operations at 324 and 326 may stop if the user 120 reacts at 326 so that the process may move to 328 or if the CDN has been sent to all of the destination devices so that the process may move to 327 after 326.

Figure 4:
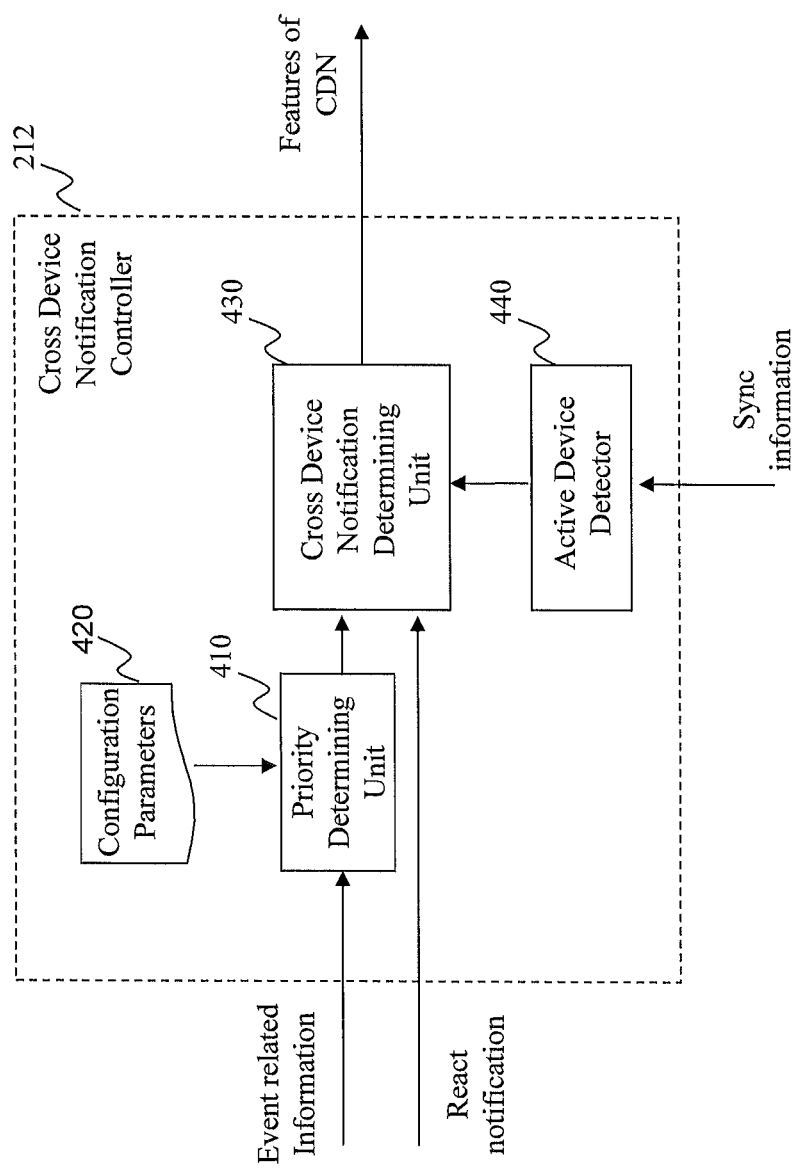
FIG. 4 is a block diagram of an exemplary embodiment of a CDN controller, in accordance with one embodiment of the present teaching.

FIG. 4 is a block diagram illustrating an exemplary embodiment of a CDN controller 212, in accordance with one embodiment of the present teaching. In this embodiment, the CDN controller 212 may include a priority determining unit 410 for determining a priority for an incoming event, an active device detector 440 for detecting active devices associated with the user 120, and a CDN determining unit 430 for determining whether a CDN is needed and determining and sending features of the CDN to the CDN generator 213 if a CDN is needed.

The priority for the incoming event may be determined at the priority determining unit 410 based on certain configuration parameters 420 and/or event related information obtained at the event detector 211. Once the event detector 211 receives an incoming event, it can analyze the event and obtain some event related information, e.g., a source of the event, time when the event is received, whether the event is urgent, etc. For example, an urgent event may be determined to have a higher priority than a regular event. The configuration parameters 420 may be set up by the user 120 to determine, e.g., a list of sources in order of priority, a list of time periods in order of priority, etc. For example, events from some specific sources, e.g., the user 120's boss, may be determined to have a higher priority than other events. Events received in certain time period, e.g., the user 120's vacation time, may be determined to have a lower priority than events received in other time periods.

The active devices may be detected at the active device detector 440, based on sync information received at the synchronization unit 217. The CDN determining unit 430 may determine whether a CDN is needed based on: the determined priority of the incoming event, whether active devices are detected, and whether a react notification has been received at the CDN determining unit 430. In one embodiment, a CDN may be determined to be needed if: a react notification has not been received, active devices have been detected, and the priority of the incoming event is higher than a predetermined threshold. In another embodiment, a CDN may be determined not to be needed if: a react notification has been received, no active devices has been detected, or the priority of the incoming event is lower than a predetermined threshold.

In case that a CDN is needed, the CDN determining unit 430 may determine features associated with the CDN. For example, the features of the CDN may indicate that whether the CDN may include some or all of the event related information, whether the CDN may include the priority of the CDN, whether the CDN may include a device ID of the current device 210-a, whether the CDN may be sent to some or all of the detected active devices, and whether the CDN may be sent to some destination active devices at the same time or one at a time. The features of the CDN may be sent by the CDN determining unit 430 to the CDN generator 213 for generating and transmitting the CDN according to the determined features.

In case that no CDN is needed, the CDN determining unit 430 may not ask the CDN generator 213 to generate or send any CDN. In that case, the CDN determining unit 430 may wait for another incoming event received at the device 210-a.

Figure 5:
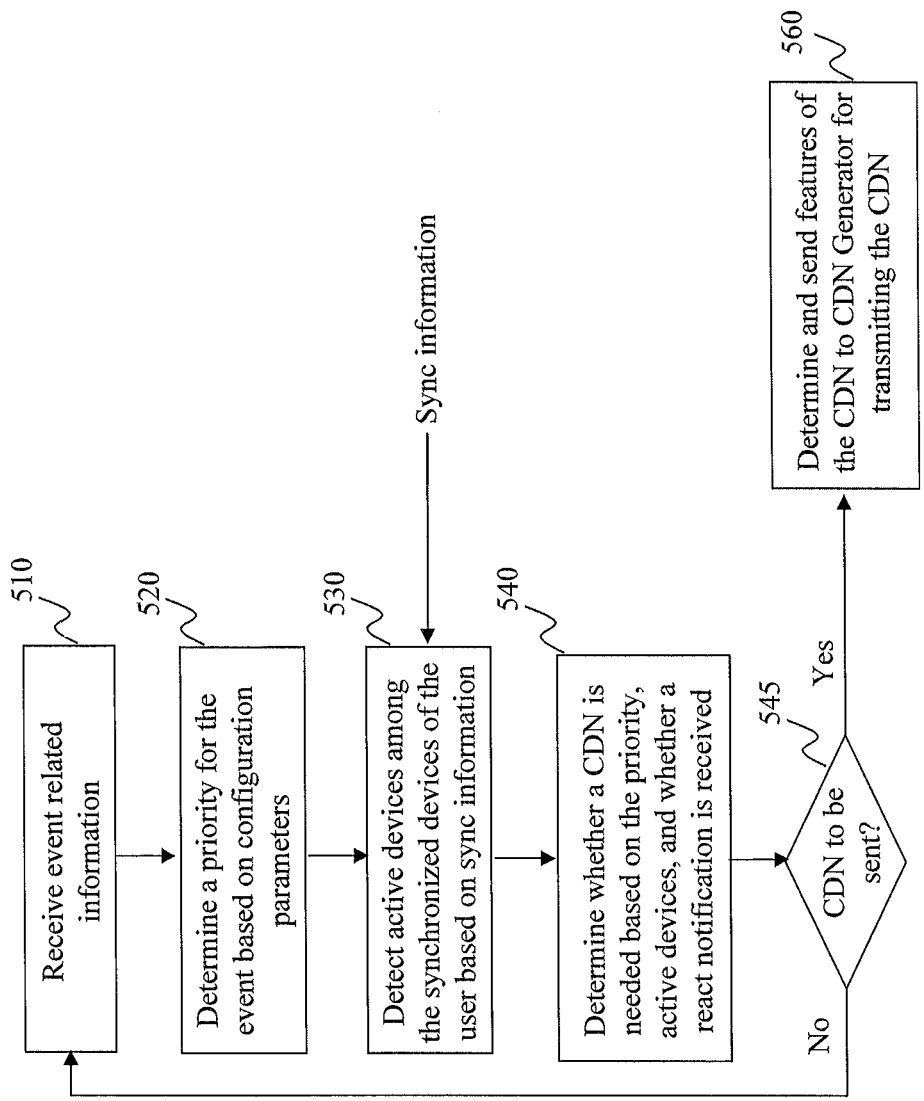
FIG. 5 is a flow chart of an exemplary process performed by a CDN controller, in accordance with one embodiment of the present teaching.

FIG. 5 is a flow chart illustrating an exemplary process performed by the CDN controller 212, in accordance with one embodiment of the present teaching. At 510, event related information about the event 101 may be received at the CDN controller 212. A priority associated with the event 101 may be determined, at 520, based on the event related information and certain configuration parameters pre-stored at the CDN controller 212. At 530, one or more active devices may be detected based on sync information collected from other synchronized devices associated with the user 120. At 540, it can be determined that whether a CDN is needed, based on the priority, whether the one or more active devices have been detected, and whether a react notification have been received by the moment of determination, at the CDN controller 212. At 545, if a CDN is determined to be needed, the process moves to 560 for determining and sending features of the CDN to the CDN generator 213 for transmitting the CDN. At 545, if a CDN is determined not to be needed, the process moves back to 510 to wait for another incoming event.

Figure 6:
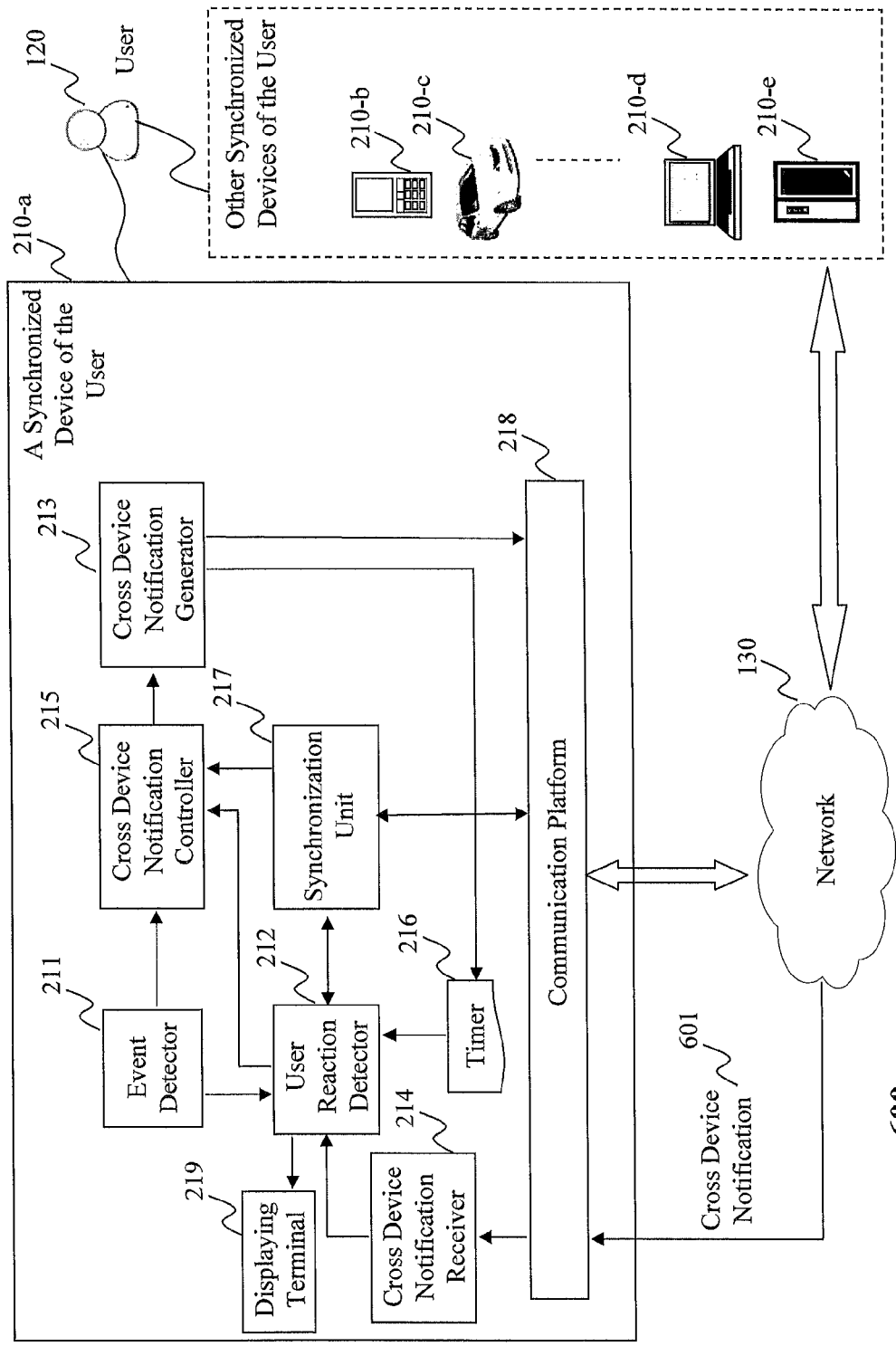
FIG. 6 illustrates an exemplary system diagram for responding to a CDN, in accordance with one embodiment of the present teaching.

FIG. 6 illustrates an exemplary system 600 for responding to a CDN 601, in accordance with one embodiment of the present teaching. The system 600, in this embodiment, may include the same hardware and structure as the system 200 shown in FIG. 2. However, different from the situation in the system 200, the device 210-a in the system 600 may not receive an incoming event. Instead, the device 210-a in the system 600 may receive a CDN 601 from a source device of the other synchronized devices 210-b, 210-c, 210-d, and 210-e.

In this embodiment, the CDN receiver 214 in the system 600 may receive the CDN 601 from the source device. The user reaction detector 212 may detect a user reaction to the CDN 601 for a third predetermined time period. If the user 120 does not react to the CDN 601 within the third predetermined time period, the displaying terminal 219 may display a third non-react message. If the user 120 reacts to the CDN 601 within the third predetermined time period, the user reaction detector 212 may send a react notification to the source device and continue a process based on the user reaction to the CDN 601.

It can be understood that in some embodiments, the device 210-a in the system 600 may be one of the active devices associated with the user 120. In that situation, if the user 120 reacts to the CDN 601 within the third predetermined time period, the user reaction detector 212 may further send a react notification to the other active devices associated with the user 120.

Figure 7:
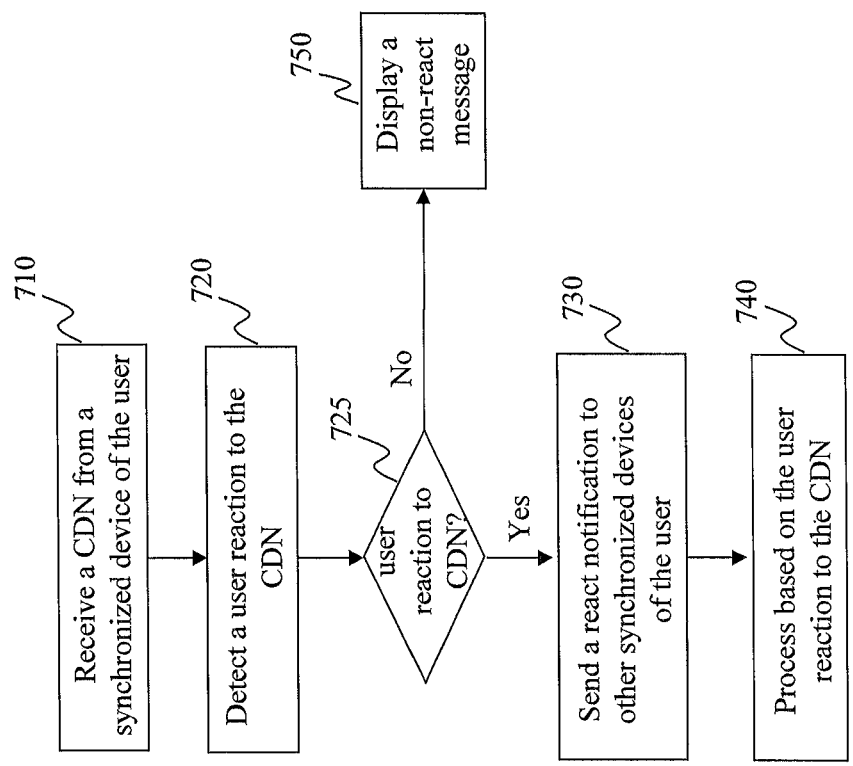
FIG. 7 is a flow chart of an exemplary process for responding to a CDN, in accordance with one embodiment of the present teaching.

FIG. 7 is a flow chart illustrating an exemplary process for responding to a CDN 601, in accordance with one embodiment of the present teaching. At 710, the CDN 601 may be received from a synchronized device of the user 120 in the system 600. At 720, a user reaction to the CDN 601 can be detected. At 725, it can be determined that whether the user 120 reacts to the CDN 601 within a third predetermined time period. If the user 120 does not react to the CDN 601 within the third predetermined time period, a non-react message may be displayed, at 750. If the user 120 reacts to the CDN 601 within the third predetermined time period, a react notification may be sent, at 730, to the synchronized device of the user 120. It can be understood that in some embodiments, the react notification may also be sent, at 730, to active devices associated with the user 120. The active devices may be detected based on sync information exchanged among the synchronized devices of the user 120. A process may be performed, at 740, based on the user reaction to the CDN 601. For example, if the CDN 601 includes an incoming email at a synchronized computer of the user 120 and the CDN 601 is received at a synchronized cell phone of the user 120, the cell phone may, at 740, display the email or operate in accordance with a reply to the email based on the user 120's reaction.

Figure 9:
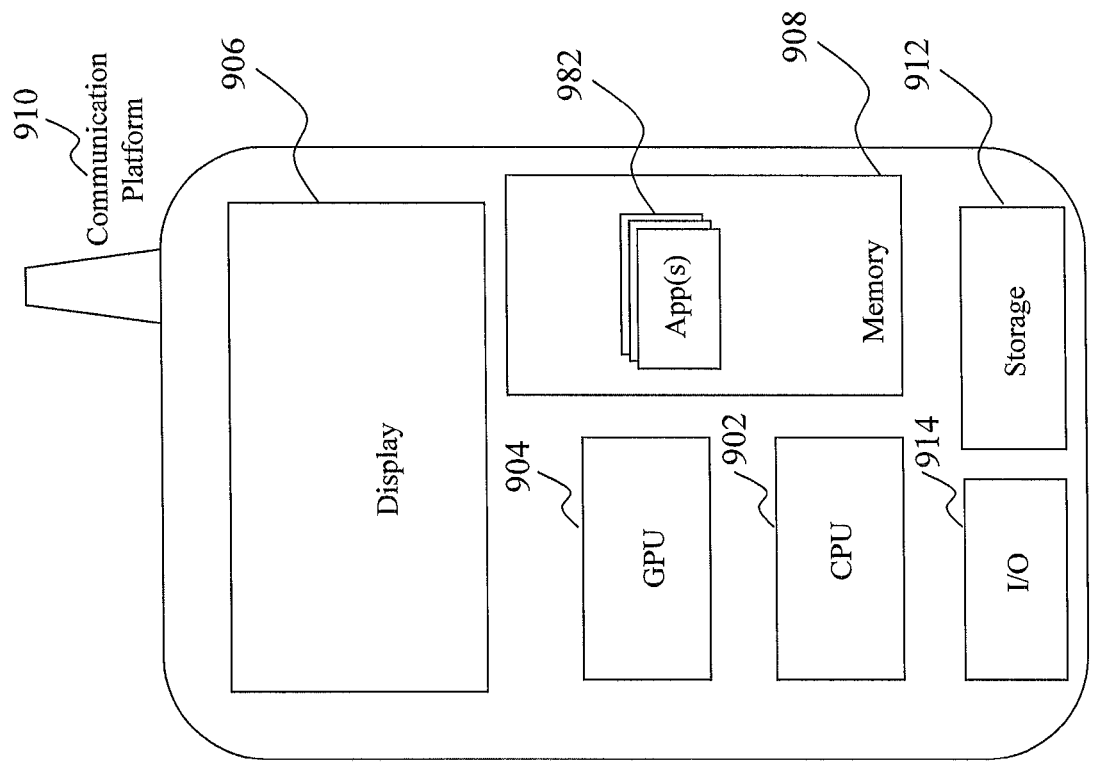
FIG. 9 depicts a general mobile device architecture on which the present teaching can be implemented.

FIG. 9 depicts a general mobile device architecture on which the present teaching can be implemented and has a functional block diagram illustration of a mobile device hardware platform which includes user interface elements. The mobile device may be a general-purpose mobile device or a special purpose mobile device. In this example, the user device is a mobile device 900, including but is not limited to, a smart phone, tablet, music player, handled gaming console, GPS. The mobile device 900 in this example includes one or more central processing units (CPUs) 902, one or more graphic processing units (GPUs) 904, a display 906, a memory 908, a communication platform 910, such as a wireless communication module, storage 912, and one or more input/output (I/O) devices 914. Any other suitable component, such as but not limited to a system bus or a controller (not shown), may also be included in the mobile device 900. As shown in FIG. 9, one or more applications 982 may be loaded into the memory 908 from the storage 912 in order to be executed by the CPU 902. The applications 982 may be executed on various mobile operating systems, e.g., iOS, Android, Windows Phone, etc. Execution of the applications 982 may cause the mobile device 900 to perform the processing as described above, e.g., in FIG. 3.

Figure 10:
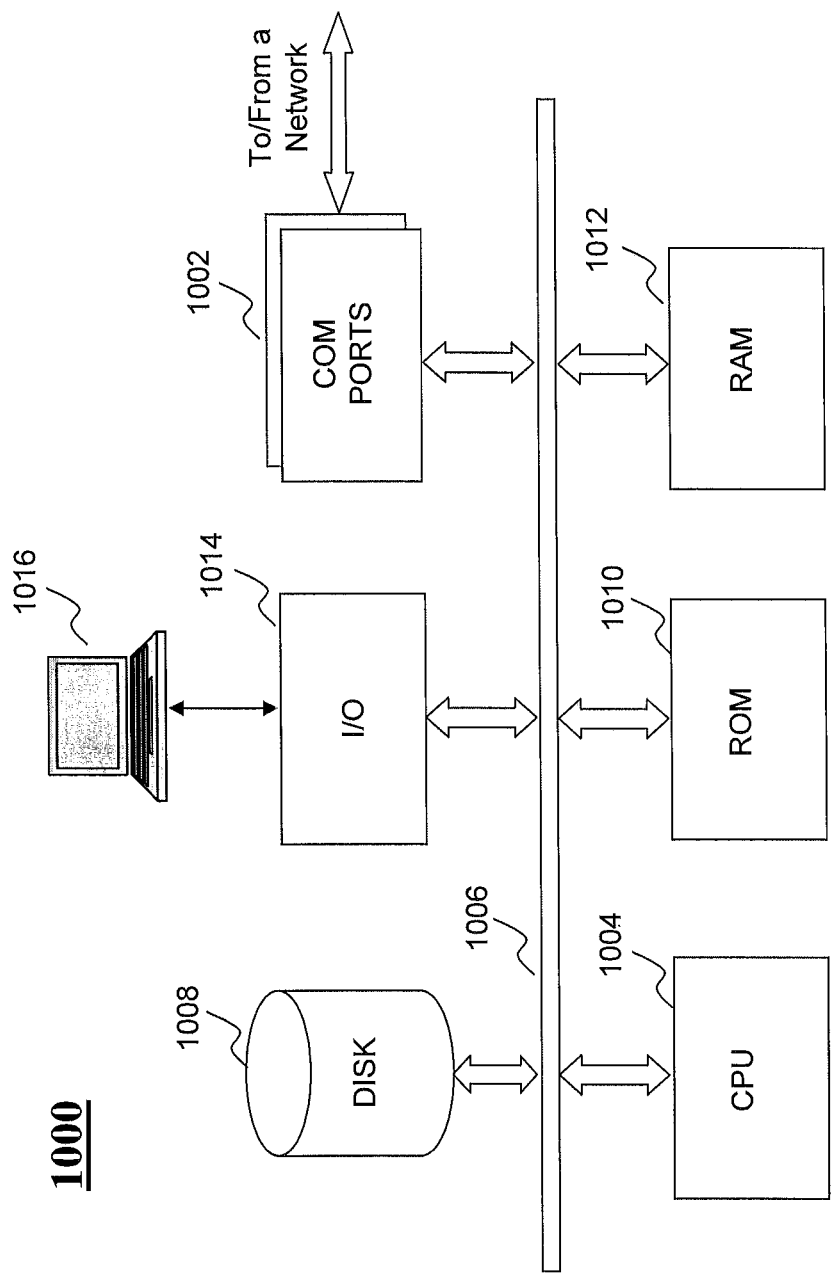
FIG. 10 depicts a general computer architecture on which the present teaching can be implemented.

FIG. 10 depicts a general computer architecture on which the present teaching can be implemented and has a functional block diagram illustration of a computer hardware platform which includes user interface elements. The computer may be a general-purpose computer or a special purpose computer. This computer 1000 can be used to implement any components of the system for CDN as described herein. Different components of the system 200, 600, e.g., as depicted in FIGS. 2 and 6, can all be implemented on one or more computers such as computer 1000, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1000, for example, includes COM ports 1002 connected to and from a network connected thereto to facilitate data communications. The computer 1000 also includes a central processing unit (CPU) 1004, in the form of one or more processors, for executing program instructions. The exemplary computer platform includes an internal communication bus 1006, program storage and data storage of different forms, e.g., disk 1008, read only memory (ROM) 1010, or random access memory (RAM) 1012, for various data files to be processed and/or communicated by the computer, as well as possibly program instructions to be executed by the CPU. The computer 1000 also includes an I/O component 1014, supporting input/output flows between the computer and other components therein such as user interface elements 1016. The computer 1000 may also receive programming and data via network communications.

Hence, aspects of the method for CDN, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teaching is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present teaching, it will be understood that various additions, modifications, and substitutions may be made therein without departing from the spirit and scope of the principles of the present teaching as defined in the accompanying claims. One skilled in the art will appreciate that the present teaching may be used with many modifications of form, structure, arrangement, proportions, materials, elements, and components and otherwise, used in the practice of the disclosure, which are particularly adapted to specific environments and operative requirements without departing from the principles of the present teaching. The presently disclosed embodiments are therefore to be considered in all respects as illustrative and not restrictive, the scope of the present teaching being indicated by the appended claims and their legal equivalents, and not limited to the foregoing description.

What is claimed is:

1. A method, implemented on a machine having at least one processor, storage, and a communication platform connected to a network for cross device notification (CDN), comprising:
   receiving, at a first device associated with a user, an incoming event, wherein the first device detects one or more active devices associated with the user other than the first device;
   detecting whether the user reacts to the incoming event on the first device;
   determining whether a CDN is needed based on whether the one or more active devices are detected and whether the user reacts to the event within a predetermined time period; and
   when a CDN is needed,
      generating the CDN, and
      transmitting the CDN to the one or more active devices.

2. The method of claim 1, further comprising waiting for another incoming event at the first device, if no CDN is needed.

3. The method of claim 1, further comprising if a CDN is needed,
   detecting a react notification with respect to the CDN from one of the one or more active devices after transmitting the CDN;
   displaying a react message at the first device if the react notification is detected within a second predetermined time period; and
   displaying a non-react message at the first device if the react notification is not detected within the second predetermined time period.

4. The method of claim 1, further comprising:
   if the user reacts to the incoming event within the predetermined time period,
      sending a react notification to the one or more active devices if the one or more active devices are detected, and
      displaying a react message at the first device; and
   if the user does not react to the incoming event within the predetermined time period,
      displaying a non-react message at the first device.

5. The method of claim 1, wherein a CDN is determined to be needed if within the predetermined time period
   the one or more active devices are detected; and
   the user does not react to the event.

6. The method of claim 1, wherein
   the step of determining whether a CDN is needed comprises determining a priority for the incoming event based on one or more configuration parameters associated with the first device; and
   a CDN is determined to be needed if
      the priority is larger than a predetermined threshold;
      the one or more active devices are detected within the predetermined time period; and
      the user does not react to the event within the predetermined time period.

7. The method of claim 1, wherein the one or more active devices are determined based on
   an input, from the user on at least one device associated with the user, for identifying the one or more active devices, and/or
   a last action of the user, detected on at least one device associated with the user, for implying the one or more active devices.

8. A method, implemented on a machine having at least one processor, storage, and a communication platform connected to a network for responding to a CDN, comprising:
   receiving, at a first device associated with a user, a CDN from a second device associated with the user, wherein
      the second device receives an incoming event for the user,
      the first device detects one or more active devices associated with the user other than the first device, and
      the second device generates the CDN after detecting that the user does not react to the incoming event on the second device within a first predetermined time period;
   detecting, at the first device, whether the user reacts to the CDN; and
   when the user reacts to the CDN within a second predetermined time period,
      sending a react notification with respect to the CDN to the second device, and
      sending the react notification to the one or more active devices when the one or more active devices are detected.

9. The method of claim 8, further comprising displaying a non-react message at the first device, if the user does not react to the CDN within the predetermined time period.

10. The method of claim 8, wherein the one or more active devices are determined based on
    an input, from the user on at least one device associated with the user, for identifying the one or more active devices, and/or
    a last action of the user, detected on at least one device associated with the user, for implying the one or more active devices.

11. An apparatus including at least one processor, storage, and a communication platform connected to a network for CDN, comprising:
    an event detector configured for receiving an incoming event;
    a user reaction detector configured for detecting whether the user reacts to the incoming event;
    a CDN controller configured for
       detecting one or more active devices, wherein the apparatus and the one or more active devices are associated with a user, and determining whether a CDN is needed based on whether the one or more active devices are detected and whether the user reacts to the event within a predetermined time period; and a CDN generator configured for generating and transmitting the CDN to the one or more active devices, when a CDN is needed.

12. The apparatus of claim 11, wherein the CDN controller is further configured for waiting for another incoming event if no CDN is needed.

13. The apparatus of claim 11, further comprising a displaying terminal, wherein:

the user reaction detector is further configured for detecting a react notification with respect to the CDN from one of the one or more active devices if the CDN is transmitted; and the displaying terminal, in conjunction with the user reaction detector, is configured for displaying a react message if the react notification is detected within a second predetermined time period, and displaying a non-react message if the react notification is not detected within the second predetermined time period.

14. The apparatus of claim 11, further comprising a displaying terminal, wherein:

the user reaction detector is further configured for sending a react notification to the one or more active devices if the user reacts to the incoming event and the one or more active devices are detected within the predetermined time period; and the displaying terminal, in conjunction with the user reaction detector, is configured for displaying a react message if the user reacts to the incoming event within the predetermined time period, and displaying a non-react message if the user does not react to the incoming event within the predetermined time period.

15. An apparatus including at least one processor, storage, and a communication platform connected to a network for responding to a CDN, comprising:

a CDN receiver configured for receiving a CDN from a device, wherein the apparatus and the device are associated with a user, the device receives an incoming event for the user, and the device generates the CDN after detecting that the user does not react to the incoming event on the device within a first predetermined time period;

a CDN controller configured for detecting one or more active devices associated with the user; and a user reaction detector configured for:

detecting whether the user reacts to the CDN, and when the user reacts to the CDN within a predetermined time period, sending a react notification with respect to the CDN to the device, and sending the react notification to the one or more active devices when the one or more active devices are detected.

16. The apparatus of claim 15, further comprising a displaying terminal configured for displaying a non-react message at the apparatus if the user does not react to the CDN within the predetermined time period.

17. A system including at least one processor, storage, and a communication platform connected to a network for CDN, comprising:

a first device associated with a user;

at least one second device associated with the user; and a CDN mechanism residing in each of the devices associated with the user, wherein the first device detects one or more active second devices, detects whether the user reacts to an incoming event, determines whether a CDN is needed based on whether the one or more active second devices are detected and whether the user reacts to the incoming event within a first predetermined time period, and when a CDN is needed, generates and transmits the CDN to the one or more active second devices, and each of the one or more active second devices receives a CDN from the first device, detects each remaining active second device, detects whether the user reacts to the CDN on the active second device, and if the user reacts to the CDN within a second predetermined time period, sends a react notification with respect to the CDN to the first device, and sends the react notification to each remaining active second device when the remaining active second device is detected.

18. A machine-readable tangible and non-transitory medium having information for CDN, wherein the information, when read by the machine, causes the machine to perform the following:

receiving, at a first device associated with a user, an incoming event, wherein the first device detects one or more active devices associated with the user other than the first device;

detecting whether the user reacts to the incoming event on the first device;

determining whether a CDN is needed based on whether the one or more active devices are detected and whether the user reacts to the event within a predetermined time period; and when a CDN is needed, generating the CDN, and transmitting the CDN to the one or more active devices.

19. The medium of claim 18, the information, when read by the machine, further causing the machine to wait for another incoming event at the first device, if no CDN is needed.

20. The medium of claim 18, the information, when read by the machine, further causing the machine to perform the following if a CDN is needed:

detecting a react notification with respect to the CDN from one of the one or more active devices after transmitting the CDN;

displaying a react message at the first device if the react notification is detected within a second predetermined time period; and displaying a non-react message at the first device if the react notification is not detected within the second predetermined time period.

21. The medium of claim 18, the information, when read by the machine, further causing the machine to perform the following:

if the user reacts to the incoming event within the predetermined time period, sending a react notification to the one or more active devices if the one or more active devices are detected, and displaying a react message at the first device; and if the user does not react to the incoming event within the predetermined time period, displaying a non-react message at the first device.

22. A machine-readable tangible and non-transitory medium having information for responding to a CDN, wherein the information, when read by the machine, causes the machine to perform the following:

receiving, at a first device associated with a user, a CDN from a second device associated with the user, wherein
the second device receives an incoming event for the user, the first device detects one or more active devices associated with the user other than the first device, and the second device generates the CDN after detecting that the user does not react to the incoming event on the second device within a first predetermined time period;

detecting, at the first device, whether the user reacts to the CDN; and when the user reacts to the CDN within a predetermined time period, sending a react notification with respect to the CDN to the second device, and sending the react notification to the one or more active devices when the one or more active devices are detected.

* * * * *